Oct. 28, 1930.  C. A. GRATIOT  1,779,699
LAWN MOWER
Original Filed Dec. 15, 1927

Inventor
Chester A. Gratiot
By Horace Barnes
Attorney

Patented Oct. 28, 1930

1,779,699

UNITED STATES PATENT OFFICE

CHESTER A. GRATIOT, OF PORTLAND, OREGON, ASSIGNOR, BY MESNE ASSIGNMENTS, TO EVERSHARP LAWNMOWER COMPANY, A CORPORATION OF NEVADA

LAWN MOWER

Application filed December 15, 1927, Serial No. 240,195. Renewed March 17, 1930.

The principal object of my invention is to protect the revolving cutters of a lawn mower from damage by stones or other hard objects accidentally coming in contact therewith.

A second object is to protect the positive gearing serving to drive the rotary cutters from damage occasioned by the sudden stopping of the cutters.

Other objects and advantages of my invention, and objects relating to details of construction and arrangements of parts, will be readily apparent in the course of the detailed description to follow.

The accompanying drawings illustrate by way of example a preferred form of my invention, in which.

Figure 1:
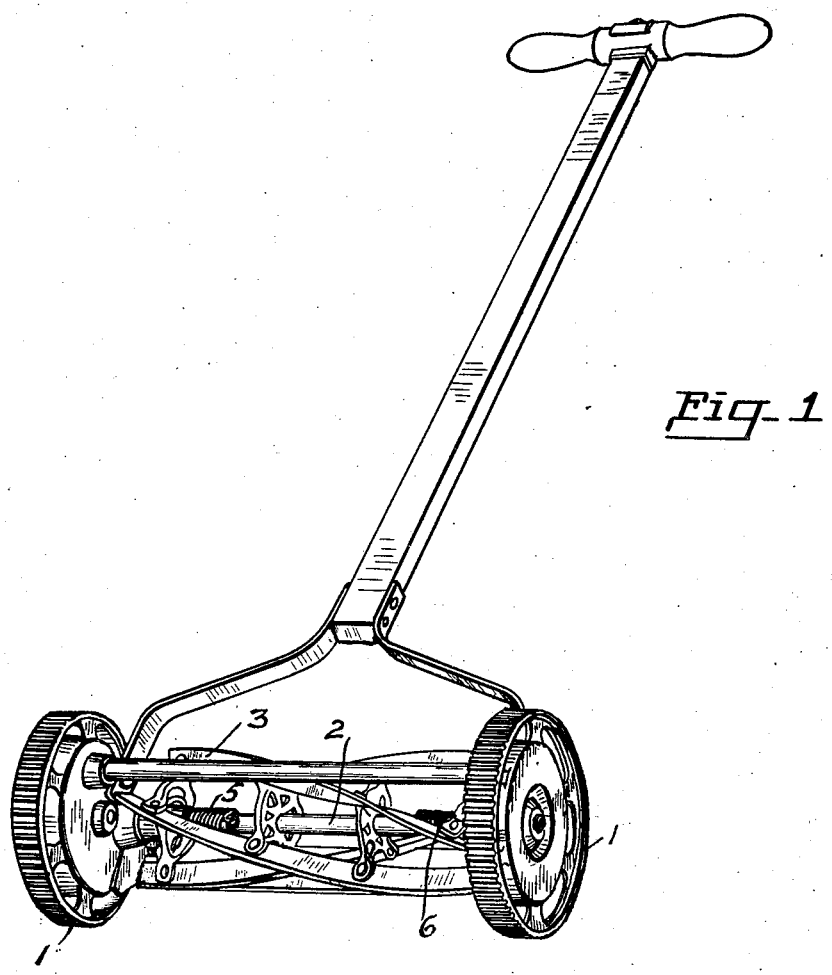
Figure 1 is a view in perspective of the entire lawn mower.
Figure 2:
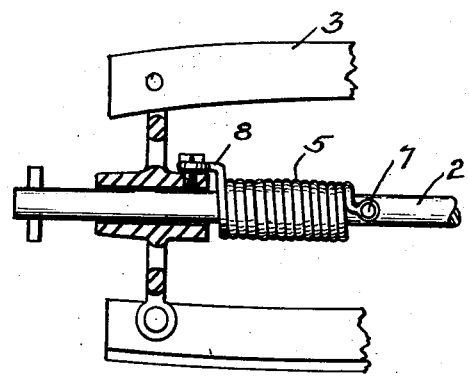
Fig. 2 is a fragmentary view in axial section of one end of the cutter head showing the manner of attachment thereof to the cutter head shaft.

Referring to said views, the reference numeral 1 indicates two traction wheels. A spindle or shaft 2 is driven by a cog wheel gear from the traction wheels in the usual manner. The cutter head 3 is fitted to the spindle 2 so that it is free to either rotate or slide axially thereon.

Two coil springs 5 and 6 disposed upon the spindle 2 are similarly attached to the spindle 2 and cutter head 3 to drive the latter in rotary motion and constrain it to a medial position lengthwise.

The inner end of each spring, as 7, is fixed to the spindle 2 while the other end is fixed to the cutter head, as 8. These two springs are so attached as to be strained in equal tension to permit of a slight axial movement of the cutter head before the coils of one spring or the other are fully compressed.

The cutter head being virtually free upon the shaft with a certain amplitude of movement permitted by the springs may stop momentarily or similarly exceed the rotative speed of the spindle.

Upon coming in contact with a stone or other hard object the cutter head will be brought to a sudden stop without shock to the driving gear.

Such an obstacle is not susceptible of free shearing acts to transform the rotary momentum of the cutter head into an endwise or axial thrust due to the spiral shape of the cutters. This movement of the cutter head axially will tend to roll the stone between the spiral cutter and the stationary rectilinear blade and tend to dislodge the obstacle.

It will be observed that a great portion of the work expended by the suddenly retarded cutter head is dissipated in axial oscillations of the cutter head upon the spindle rather than in disarranging the alignment of the cutters as is usual when the cutter head is inflexibly driven.

From the foregoing description, taken in connection with the accompanying drawings, the advantages of the construction and application of my improved lawn mowers will be readily apparent; but, while I have described the principle of operation of the invention, together with the devices I now consider the best embodiment thereof, it will be readily understood that the structures shown are merely illustrative and that such changes may be made therein as will lie within the scope of the following claims.

Having described my invention, what I claim, is:

1. In lawn mowers employing a cutter head composed of cutters the edges of which are spirally disposed, and which is arranged to revolve in contact with a stationary knife, a flexible cutter head driving mechanism comprising a driving spindle, a cutter head loosely mounted thereon with respect to both axial and rotative relation, and two oppositely disposed helical springs surrounding said spindle attached at the inner ends to the said spindle and to the said cutter head at the outer ends to yieldingly maintain said cutter-head in medial position on said spindle.

2. In lawn mowers employing a cutter head the cutting edges of which are spirally disposed, and which is arranged to revolve against a stationary knife, a flexible cutter head driving mechanism comprising a driving spindle, a cutter head loosely fitted to said spindle, and a pair of helical springs oppositely disposed upon said spindle and secured rotatively therewith at one end and to the cutter head on the other end to yieldingly maintain said cutter-head in medial position on said spindle.

CHESTER A. GRATIOT.